United States Patent [19]

Pratelli

[11] 4,119,805
[45] Oct. 10, 1978

[54] LINE-CONTROL UNIT FOR TELECOMMUNICATION SYSTEM

[75] Inventor: Cesare Pratelli, Milan, Italy

[73] Assignee: Societa Italiana Telecomunicazioni Siemens S.p.A., Milan, Italy

[21] Appl. No.: 808,438

[22] Filed: Jun. 20, 1977

Related U.S. Application Data

[63] Continuation-in-part of Ser. No. 775,399, Mar. 7, 1977, abandoned.

[30] Foreign Application Priority Data

Mar. 8, 1976 [IT] Italy .............................. 20944 A/76

[51] Int. Cl.² ............................................ H04M 15/06
[52] U.S. Cl. ............................ 179/18 FC; 179/18 ES
[58] Field of Search ....... 179/18 FC, 18 ES, 175.2 R, 179/15 AT, 15 BY

[56] References Cited

U.S. PATENT DOCUMENTS

| | | | |
|---|---|---|---|
| 3,573,386 | 4/1971 | Thompson | 179/18 FC |
| 4,001,514 | 1/1977 | Wurst | 179/18 FC |
| 4,007,338 | 2/1977 | McLaughlin | 179/18 FC X |

Primary Examiner—Thomas A. Robinson
Attorney, Agent, or Firm—Karl F. Ross

[57] ABSTRACT

A terminal serving a group of subscriber lines, some of which are invariably paired with remote stations through so-called "hot-line" connections, has a line concentrator/distributor from which a lesser number of line links extend to an automatic exchange at a nodal point of a data and/or voice telecommunication system. The line concentrator/distributor is controlled by a marker connected via a separate signaling channel with a line-control unit at the nodal point, that unit including a classifier which stores information fully identifying each associated subscriber line in terms of call number and class of service while also correlating the address of each line link on the terminal side with that on the address side. A programmer in the line-control unit successively scans the several line links in respective sampling phases of a recurrent TDM cycle and also establishes a service phase in that cycle during which an engagement message from the marker, arriving over the signaling channel at an input/output circuit of that unit, is relayed to the classifier which transmits the identity of the calling subscriber line and of its assigned line link as well as the service class of the subscriber to the programmer for the initiation of a call-extending program in the corresponding sampling phase. The line-control unit further includes checking circuits for signaling an alarm condition in the event of a malfunction or an erroneous selection.

12 Claims, 7 Drawing Figures

LINE-CONTROL UNIT FOR TELECOMMUNICATION SYSTEM

CROSS-REFERENCE TO RELATED APPLICATION

This is a continuation-in-part of my copending application Ser. No. 775,399 filed 7 Mar. 1977 and now abandoned.

FIELD OF THE INVENTION

My present invention relates to a line-control unit for a voice and/or data telecommunication system of the type wherein a group of subscriber lines or stations are served by a common terminal communicating with an automatic exchange at a nodal point via a reduced number of line links which are accessible to the subscriber lines by way of a marker-controlled switching unit acting as a line concentrator/distributor.

BACKGROUND OF THE INVENTION

In commonly owned Italian Pat. No. 988,593 there has been described a system of this type wherein at least one subscriber station at such a terminal is paired with another station at a different terminal, the two paired stations being invariably interconnected over a so-called "hot line" by the intervening switching units whenever one of these stations initiates a call. For this purpose, in that prior system, the terminals designed for such mixed service and linked with a particular nodal point are confronted at that point by respective switching units complementary to their own, i.e. line distributors/concentrators, whose markers are tied to those of the terminals via separate signaling channels independent of the line links. Upon the initiation of a call by a subscriber, the associated outlying marker detects the activity of the corresponding line and assigns to it an available line link while sending an identification of that subscriber line and of the assigned link (unless such assignment proceeds in an invariable order of priority) to the coacting marker at the nodal point. The latter, when recognizing the caller as a paired station, extends the connection through another switching unit at the nodal point to the remote terminal serving the station paired with the caller. The marker at the remote terminal then completes the "hot-line" connection in response to an address received over its signaling channel. The automatic exchange at the nodal point intervenes in the case of ordinary connections, i.e. in extending calls from subscribers with unrestricted access in response to selection signals such as dialing pulses.

OBJECTS OF THE INVENTION

The general object of my present invention is to provide a circuit arrangement — referred to hereinafter as a line-control unit — at a nodal point of a telecommunication system of the character referred to which, in co-operation with an associated automatic exchange, eliminates the need for complementary line distributors/concentrators at that nodal point while facilitating the establishment of both "hot lines" and selective connections between terminals of the aforedescribed mixed-service type as well as between any such terminal and other parts of the system.

A more particular object is to provide means in such a line-control unit for insuring reliable performance and elimination of switching errors, especially in a system operating according to time-division-multiplex (TDM) principles.

SUMMARY OF THE INVENTION

A line-control unit according to my invention, communicating with an outlying marker via a separate signaling channel, comprises storage means connected to a remote marker through an intervening signaling channel for registering engagement messages originating at (or destined for) that marker. An engagement message coming from the marker identifies a calling subscriber line, as well as the line link temporarily assigned thereto by the marker, the presence of such a message being ascertainable by a programmer within the unit periodically communicating with the storage means during a service phase of a recurrent TDM working cycle. A component of the unit termed a classifier includes a data store engageable by the programmer for reading out data, including service-class information, relating to the calling subscriber line identified in the detected engagement message; these read-out data are delivered to the automatic exchange by a retransmitter which is periodically connected to the classifier under the control of the programmer for utilization in the extension of the call by the exchange. Thus, if the calling subscriber station is part of a pair participating in a "hot-line" connection, that fact as well as the identity of the paired station is included in the service-class information read out from the data store of the classifier.

In the case of a "hot line", therefore, no called-station address need be transmitted from the terminal to the nodal point so that an assigned line link need not be engaged for a period longer than necessary to exchange message signals (usually data) over the established connection. However, a code read out from the classifier may also inform the automatic exchange whether the calling station is equipped for voice and/or data transmission, thus enabling a discriminator at the exchange to determine whether an address dialed in by the caller is compatible with that station's own class of service.

In accordance with a particularly advantageous feature of my invention, the caller identification in an engagement message received from the marker contains only an abbreviated local address which is then translated by the classifier into a system-wide address (i.e. call number) read out to the automatic exchange. Similarly, the classifier may translate a first address identifying the engaged line link, in terms of its designation at the terminal, into a second address used at the nodal point for such identification. The availability of two distinct sets of addresses, correlated by a memory in the classifier, simplifies the modification of the connections between the line links and a switching matrix at the exchange whenever such modification becomes necessary because of changes within the system. The classifier of the line-control unit carries out a reverse translation when receiving a line-link identification from the automatic exchange in the case of a call destined for a subscriber line served by the associated marker.

BRIEF DESCRIPTION OF THE DRAWING

The above and other features of my invention will now be described in detail with reference to the accompanying drawing in which.

SPECIFIC DESCRIPTION

Figure 1:
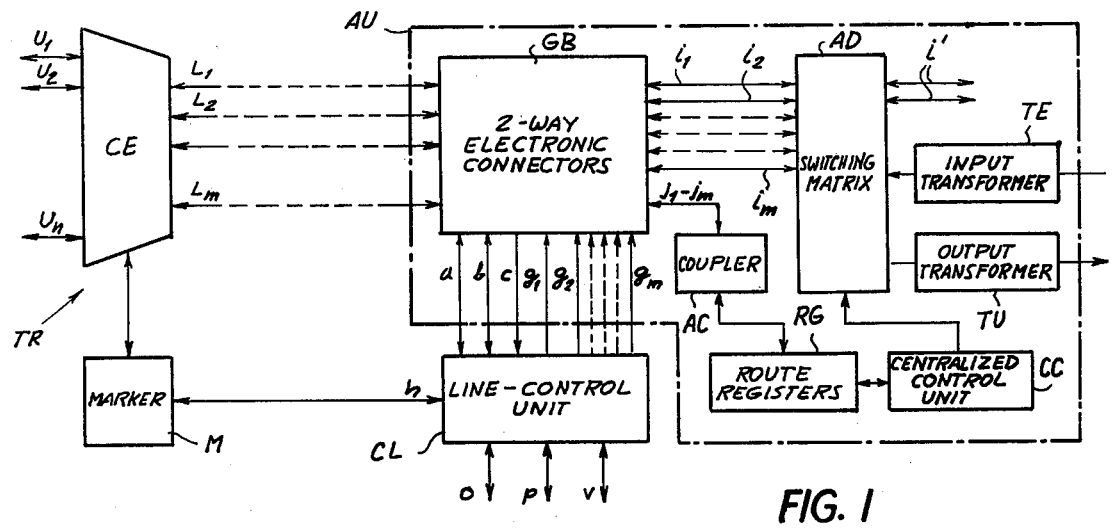
FIG. 1 is a block diagram of a terminal communicating with an automatic exchange through the intermediary of a line-control unit according to my invention.

In FIG. 1 I have illustrated part of a voice and/or data telecommunication system including a mixed-service terminal TR associated with a group of subscriber lines $U_1, U_2, \ldots U_n$, this being one of several such terminals associated with an automatic exchange AU to which these lines are connectable via a conventional line concentrator/distributor CE at the terminal and a number of line links $L_1, L_2, \ldots L_m$ emanating therefrom, with $m < n$. In the specific instance here assumed, the number of subscriber lines (or stations) is $n = 500$ while the number of line links is $m = 100$.

Line concentrator/distributor CE is controlled by a marker M which may be of the type described in commonly owned application Ser. No. 657,389 filed Feb. 11, 1976 by Gualtiero Rigo et al, now U.S. Pat. No. 4,042,785 dated 16, Aug. 1977. The marker is connected to a signaling channel $h$ over which it transmits, on an outgoing call, the identities of the calling subscriber line and the line link temporarily assigned thereto and over which it receives, in the event of an incoming call, the identities of the line link seized at the exchange AU and of the subscriber line to be connected by unit CE to that line link. The identification of the subscriber line will in this instance be a 3-digit number ($rst$), ranging between 001 and 500, while that of the line link is a 2-digit number ($xy$) ranging between 00 and 99.

Channel $h$ extends to a line-control unit CL located at a nodal point containing the exchange AU. That exchange comprises an array of two-way electronic connectors, one for each line link, from which extensions $i_1, i_2, \ldots i_m$ of the respective line links lead to a switching matrix AD responsive to switching signals from a centralized control unit CC common to all the terminals. The latter unit receives routing information from a set of registers RG for relaying outgoing calls via an output transformer TU in respective time slots or sampling phases of a recurrent working cycle to other parts of the system as well as directing incoming calls from such other parts, arriving at an input transformer TE during such time slots, to the various line links in accordance with conventional TDM technique. Routing registers RG receive destination information, i.e. the identities of called subscribers, from connector array GB by way of a set of leads $j_1 - j_m$ and a coupler AC or directly from line-control unit CL as more fully described hereinafter. Unit CL communicates with array GB via a set of buses $a$, $b$, $c$ as well as junction lines $g_1, g_2, \ldots g_m$; that unit is further provided with external connections $o$, $p$ and $v$ respectively leading to an operator's post, an alarm or malfunction recorder and a display panel (not shown).

Switching matrix AD is also provided with further leads $i'$ extending to another connector array, not shown, which is linked with a second mixed-service terminal and an associated line-control unit.

The centralized control unit CC, on the basis of the information received from registers RG, carries out such conventional operations as the generation of ringing or busy signals and the emission of timing pulses for the determination of toll charges. A discriminator in that unit checks for a possible incompatibility, as where a calling subscriber emits a data-exchanging code after dialing a station equipped only for voice communication.

Let us assume, for example, that the marker M at terminal TR detects the initiation of a call by one of the associated subscribers to whose lines $U_1 - U_n$ it is connected via the usual test circuits (not shown). A link allocator in the marker then assigns one of the line links $L_1 - L_m$ to the calling subscriber whereupon the marker sends out, over channel $h$, an engagement message of the form $10(xy)(rst)$ where the prefix "10" is a label identifying the message as a request for a register, ($xy$) is the address of the assigned line link and ($rst$) is the designation of the calling subscriber, i.e. its local address within the $n$-member terminal group. The decadic digits $x$, $y$, $r$, $s$ and $t$ may, of course, be transmitted in binary form.

Unit CL decodes the arriving engagement message and signals the corresponding connector within array GB, over the respective junction line $g_1 - g_m$, to demand access via the associated lead $j_1 - j_m$ and coupler AC to an available route register RG. Unit CL further sends a predetermined audiofrequency as a test signal over the chosen line link $l_{(xy)}$ to terminal unit CE where that test signal is picked up by the marker M, the latter then transmitting a similar signal by way of confirmation to unit CL via the same line link. Reference may be made in this connection to commonly owned U.S. application Ser. No. 657,263 filed Feb. 11, 1976 by Franco De Marco et al, now U.S. Pat. No. 4,024,359 dated May 17, 1977. In response to that confirmation signal, unit CL sends to the marker M a reply signal over channel $h$.

Once these continuity tests have been performed satisfactorily, showing that the selected line link is in proper working condition, unit CL transmits to the allocated register RG through the corresponding connector of array GB the full directory number of the calling subscriber station (including area code, if necessary) along with classification information. In the case of a paired station, that classification information contains the identity of the remote station to which the caller is to be connected by a "hot line"; a decoder in control unit CC, responding thereto, emits switching signals for matrix AD to extend the connection. In all other instances, unit CC instructs the allocated register RG to send out a dial tone to the calling subscriber and to store the dial pulses subsequently arriving at that register by way of the engaged line link $L_{(xy)}$ and coupler AC preparatorily to an extension of the call in the usual manner.

The selection signals stored in the allocated route register RG, whether dialed in by the calling subscriber or read out from a classifier in the line-control unit CL, may identify a called station served by terminal TR, a similar unit of another such terminal (e.g. the one reachable by switching matrix AD via leads $i'$) or a conventional part of the system accessible through output transformer TU. If the call is to be extended to the terminal TR or a replica thereof, control unit CC seizes an available outgoing line link (in a manner analogous to the operation of marker M on a call originating at one of the subscriber lines $U_1 - U_n$) and forwards the designation of that line link along with the address of the called subscriber to the associated marker by way of the correspondinng line-control unit CL and signaling channel $h$. This information is incorporated by the responding unit CL in an engagement message of the form $10(xy)°(rst)°$ where $(xy)°$ identifies the outgoing line link and $(rst)°$ represents the local address of the called subscriber line. The marker M, after interconnecting the assigned line link with the called line, and upon successful completion of further continuity tests involving the line link $L_{(xy)}°$, detects the response of the called party in the usual manner and thereupon sends back to the receiving line-control unit an answering message of the form $11(xy)°$ by way of its channel $h$ for forwarding through the corresponding junction line $g_1 - g_m$ to the engaged outgoing line link and its extension $i_1 - i_m$ whence the switching matrix AD feeds it over an analogous path, including junction line $g_{(xy)}$, to the originating line-control unit CL. The latter unit then generates, by way of a acknowledgment, a message of the form $11(xy)$ for transmission to the associated marker M over its channel $h$, thereby advising that marker that the connection between the two parties has been established. An exchange of voice or data messages can now take place over the interconnected line links $L_{(xy)}$ and $L_{(xy)}°$ until one of the parties terminates the call, the disengagement being detected by the centralized unit CC in the usual manner and resulting in the opening of the corresponding switches of matrix AD as well as in the release of the previously seized route register RG. All these operations take place in accordance with conventional TDM technique, i.e. in the respective sampling phases or time slots allotted to the intercommunicating line links with interim storage of message samples in the automatic exchange AU.

In the case of an incoming call destined for one of the subscriber stations served by terminal TR and arriving through input transformer TE from the conventional part of the system, unit CC loads an engaged route register RG with the address of the caled station and again seizes, via coupler AC, an available line link extending to that terminal. This address is forwarded to unit CL, in the corresponding sampling phase of a working cycle or of a succession of such cycles and after continuity tests have been performed, whereupon unit CL again generates an engagement message of the form $10(xy)(rst)$ as described above.

Figure 2:
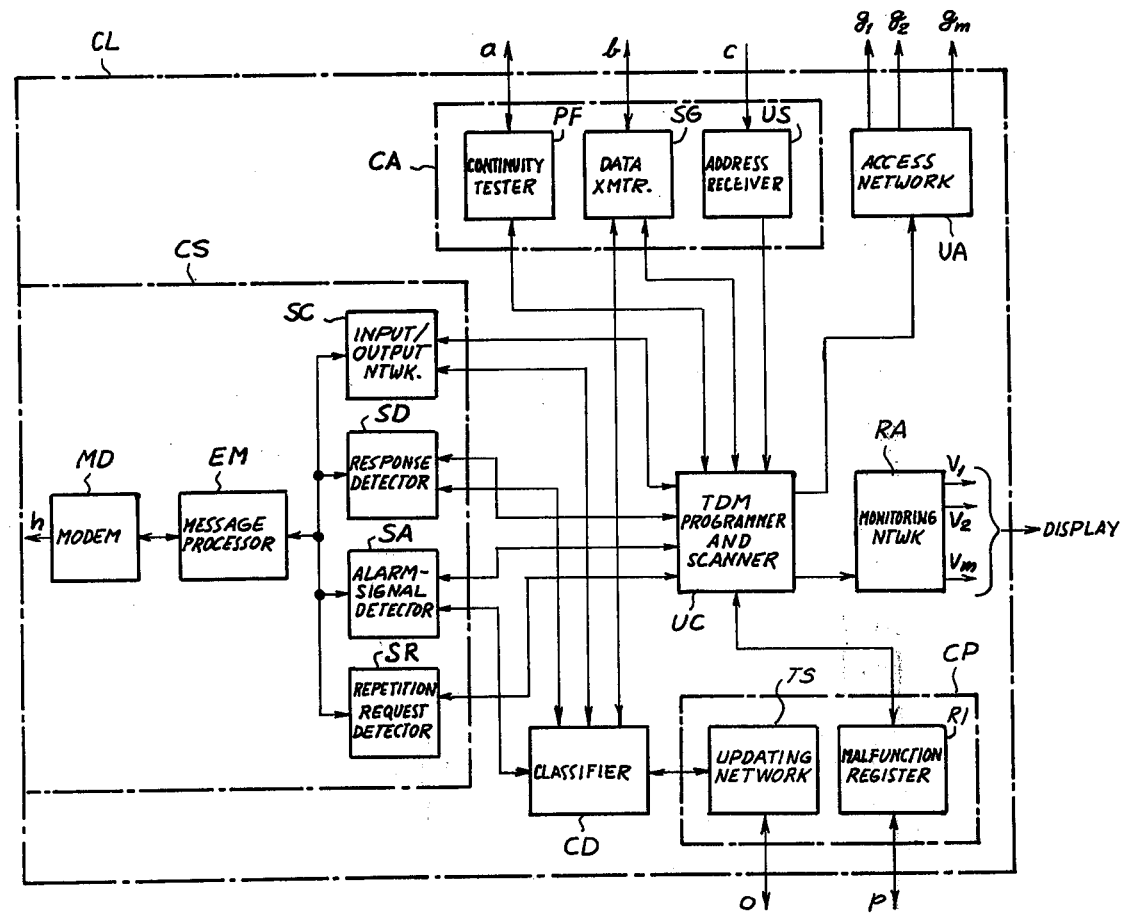
FIG. 2 shows the layout of the line-control unit illustrated in FIG. 1.

In FIG. 2 I have shown the layout of line-control unit CL whose principal components are the following:

A subunit CS connected to signaling channel $h$;

A subunit CA communicating via buses $a$, $b$ and $c$ with the connector array GB of exchange AU (FIG. 1);

an access network UA, essentially a multiplexer, sequentially energizing enabling leads $g_1 - g_m$ of connector array GB during successive sampling phases of a working cycle;

a classifier CD communicating with subunits CS and CA;

a subunit CP dialoguing with the classifier CD and with a manual controller TL (FIG. 5) in the form of a teleprinter;

a TDM programmer UC receiving clock pulses from centralized unit CC (FIG. 1) for controlling the operation of components CS, CA, UA and CP; and A monitoring network RA, also controlled by the programmer, with output leads $v_1 - v_m$ (included in connection $v$ of FIG. 1) extending to a nonillustrated display device for visually indicating to an operator the state of the several line links $L_1 - L_m$, including possible malfunctions, on the basis of signals received from programmer UC.

Subunit CS comprises a modem MD, connected to channel $h$, which coacts with a message processor EM having two-way connections to an input/output network SC, a response detector SD, an alarm-signal detector SA and a repetition-request detector SR. Processor EM distributes incoming signals from channel $h$, received via modem MD, according to their prefixes to the several components SC, SD, SA, SR and in turn feeds similar signals from these components to modem MD for transmission to marker M under the control of programmer UC.

Subunit CA comprises a continuity tester PF connected to two-way bus $a$ for emitting and receiving the aforedescribed audiofrequency signals, a data retransmitter SG tied to two-way bus $b$, and an address receiver US linked to bus $c$.

Subunit CP comprises an updating network TS, tied to teleprinter TL by two-way connection $o$, and a malfunction register RI linked with programmer UC, this register communicating by way of programmer UC with alarm-signal detector SA in order to apprise an external recorder (such as teleprinter TL) of the occurrence of operational errors; register RI is connected to that external recorder via two-way link $p$ which can also receive malfunction signals from other parts of the system for forwarding to the recorder and to detector SA.

Programmer UC contains a memory of $m+k$ cells which are sequentially addressed, in the course of a working cycle, by timing signals generated by an internal scanner which also controls the access unit UA and is triggered by the clock pulses from centralized unit CC via a connection not shown. The construction of this programmer may conform to that described in commonly owned application Ser. No. 737,269 filed Nov. 1, 1976 by Giovanni Carubia et al. The first $m$ cells contain information received during respective sampling phases from peripheral subunits CS and CA, i.e. signals revealing the engaged, idle or faulty state of the corresponding line links $L_1 - L_m$. The $k$ remaining time slots, numbered 100 – 106, for example, are service phases reserved for the performance of tests and the detection of engagement messages; more particularly, it will be assumed that incoming engagement messages are detected in phase 100 when programmer UC communicates with network SC.

Network RA is essentially a random-access memory which may be divided into two sections, one of them registering the state of activity of normally functioning line links while the other stores the identities of line links found to be defective. This enables the operator to determine from the associated display devices how many line links, if any, are in a faulty condition.

Except for access network UA, which is switched in the rhythm of the sampling phases established by the scanner within programmer UC, and monitoring network RA, receiving its information from the programmer during the same sampling phases, the components of unit CL are made available to only one incipient call at a time. Classifier CD, operating asynchronously, processes the arriving subscriber-station and line-link addresses in the order in which they are received, with the aid of conventional priority circuitry as more fully described hereinafter.

Figure 3:
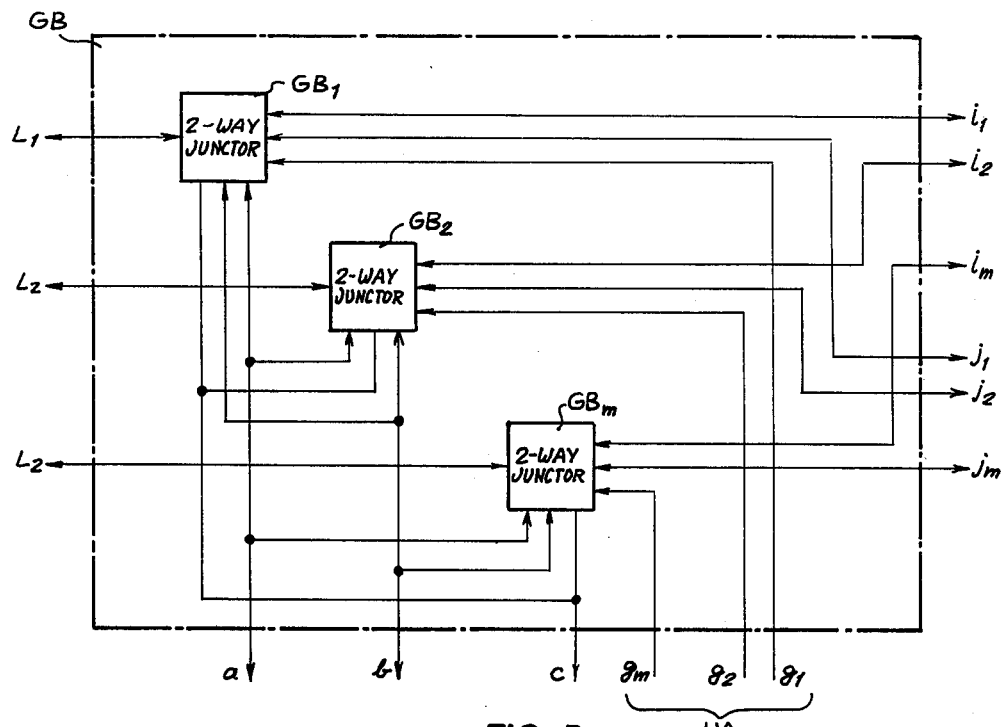
FIG. 3 shows details of a connector array forming part of the automatic exchange illustrated in FIG. 1.

In FIG. 3 I show details of the two-way connector array GB which includes a multiplicity of connectors $GB_1, GB_2, \ldots GB_m$ respectively tied to line links $L_1, L_2, \ldots L_m$. It will be noted that buses $a$, $b$ and $c$ are common to all the connectors whereas junction lines $g_1, g_2, \ldots g_m$ are individual thereto. Also individual to these connectors are leads $i_1, i_2, \ldots i_m$, extending to switching matrix AD of FIG. 1, as well as leads $j_1, j_2, \ldots j_m$ terminating at coupler AC. The connectors are inactive in the absence of a command issued by way of the corresponding junction lines during respective sampling phases by access network UA.

Figure 4:
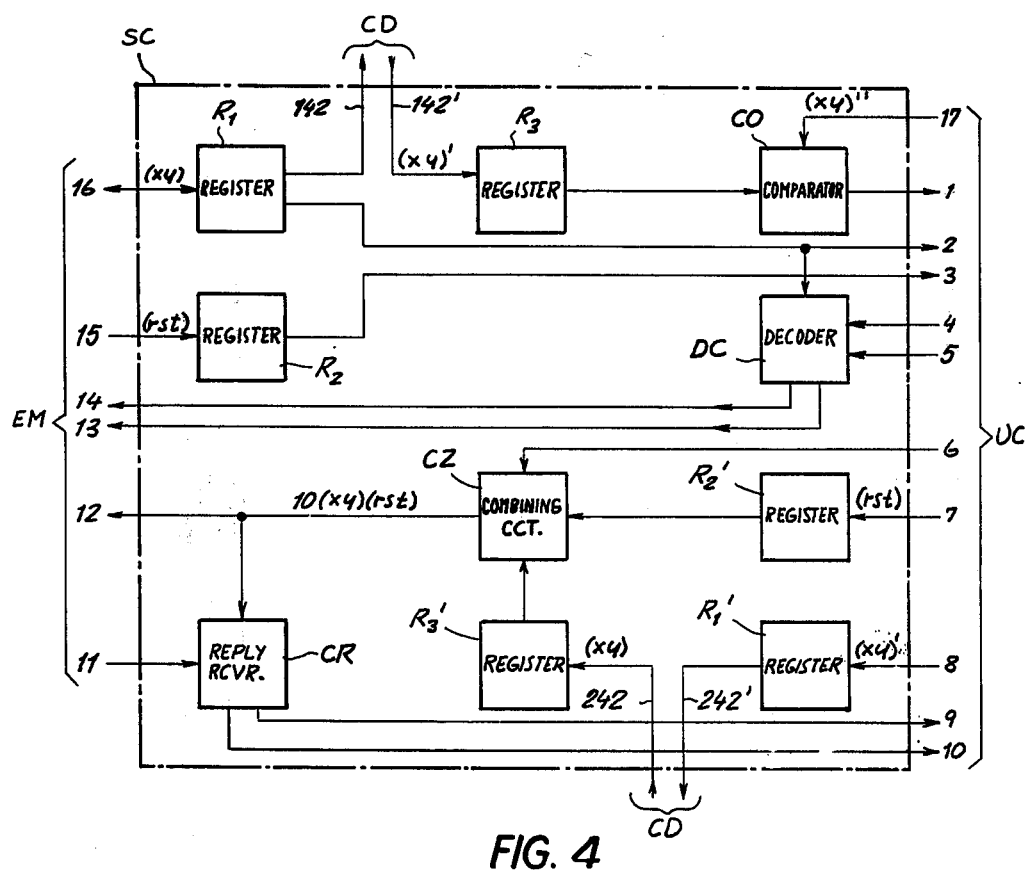
FIGS. 4–7 are detailed circuit diagrams of respective components of the line-control unit shown in FIG. 2.

FIG. 4 shows details of input/output network SC linked with processor EM by incoming leads 11, 15, 16 and outgoing leads 12 – 14. Output leads 1 – 3, 9 and 10 extend from network SC to programmer UC from which input leads 4 – 8 and 17 go back to that network.

Incoming engagement messages are stored in a pair of registers $R_1$ and $R_2$ respectively receiving from processor EM, via leads 16 and 15, the line-link address $(xy)$ and the subscriber-line address $(rst)$ together with a writing command derived from prefix "10". The loading of these two registers is signaled in service phase 100 by way of leads 2, 3 to programmer UC which thereupon initiates, in another service phase, the aforedescribed continuity tests through component PF. If the tests are satisfactory, the programmer energizes the lead 4 terminating at a decoder DC; if not, the negative result is communicated to the decoder via lead 5. In either case, decoder DC then energizes lead 13 to switch the processor EM to lead 14 for the purpose of generating the reply signal for marker M if, and only if, the mode of energization of lead 14 indicates a positive result.

Meanwhile, the line-link address stored in register $R_1$ is also transmitted over a lead 142 to classifier CD as soon as the latter is available. The classifier then reads out from its data store, over a lead 142', a translation of that line-link address into a designation $(xy)'$ in conformity with the code used by the exchange AU, i.e. with the order in which the several line links are tied to the connectors $GB_1 - GB_m$ of FIG. 3. The modified link address $(xy)'$ is stored in a third register $R_3$ feeding an input of a comparator CO whose other input cyclically receives from the scanner of programmer UC, via lead 17, the identification $(xy)''$ of all the associated line links according to the exchange code, these latter identifications appearing on lead 17 during respective sampling phases. Comparator CO energizes its output lead 1 only during the corresponding sampling phase in which $(xy)'$ = $(xy)''$, e.g. during phase 44 (actually the 45th phase) if the address $(xy)$ translates into an address $(xy)'$ = 44. In response to that energization, programmer UC loads the corresponding cell of its memory with the address $(rst)$ of the calling subscriber station fed to it via lead 2. Classifier CD then intervenes a second time, as more fully described hereinafter, to read out the requisite information on that subscriber line (such as directory number and class of service) to component SG for retransmission to the engaged route register RG via bus $b$, the corresponding connector $GB_{(xy)}$, and coupler AC.

In the case of engagement messages originating at the exchange, destined for the subscriber line identified by address $(rst)$, that address is received by a register $R_2'$ over lead 7 while a companion register $R_1'$ receives over lead 8 the address $(xy)'$ of the junction line seized by the coupler AC in the usual manner upon instructions from control unit CC. Classifier CD then translates the link address $(xy)'$, appearing on a lead 242', into the code $(xy)$ of terminal TR which is fed over a lead 242 to a third register $R_3'$ working into an input of a combining circuit CZ having further inputs connected to register $R_2'$ and to lead 6. The latter lead periodically carries, during a service phase, a command from programmer UC calling for the transmission of the composite engagement message $10(xy)(rst)$ by way of lead 12 to processor EM for retransmission to marker M. With the marker thus switched to the chosen line link, continuity tests are then carried out by component PF under the control of the programmer; if these tests are successful, a circuit CR with a enabling input tied to lead 12 receives a reply signal from the marker through processor EM via lead 11 and informs the programmer of the result by way of leads 9, 10 which are analogous to the output leads 13, 14 of decoder DC.

Networks SD, SA and SR, not shown in detail, are similar to network SC in their connections to and from processor EM and programmer UC. Networks SC and SA also exchange information with classifier CD. Network SD handles answer-back and busy signals from the called station as well as disconnect signals generated upon the termination of a call by either party. Network SA carries alarm signals from marker M to programmer UC or vice versa. Network SR, summoned prior to the establishment of a connection in the event of a false or incomplete engagement message, asks the originating marker (at terminal TR or at another terminal) to repeat the identification of the subscriber line and/or the assigned line link.

Figure 5:
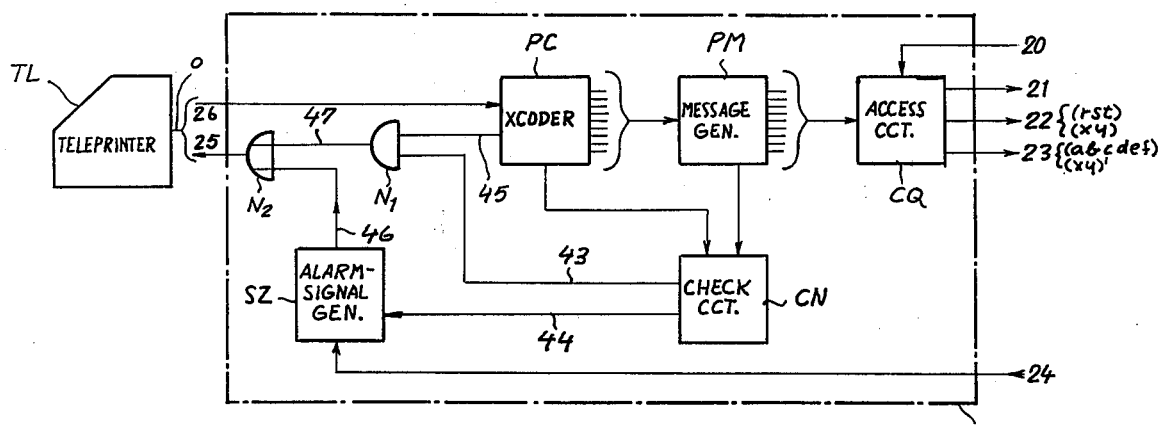

The updating network TS in subunit CP, more fully illustrated in FIG. 5, allows the contents of classifier CD to be modified if conditions change. For this purpose, network TS comprises a transcoder PC communicating with teleprinter TL by way of connection $o$ which in FIG. 5 is shown to include an incoming line 26 and an outgoing line 25. Transcoder PC has a multiplicity of parallel output leads over which, on the basis of an accompanying code signal, it sends out various bit combinations representing (I) the terminal-side address $(xy)$ of a line link whose exchange-side address is to be changed, (II) the new exchange-side address $(xy)'$, (III) the local address $(rst)$ of a line $U_1 - U_n$ serving a new subscriber station or one whose directory number and/or service class is to be modified, and (IV) a code $(abcdef)$ containing that new information. A word combining the data (I+II) or (III+IV) then appears, again in binary form, on a set of parallel output leads of a message generator PM connected to the transcoder and is fed to an access circuit CQ which, in response to an enabling signal on a lead 20 emanating from classifier CD (see FIG. 6), delivers to that classifier the address part $(rst)$ or $(xy)$ on a lead 22 and the operative part $(abcdef)$ or $(xy)'$ on a lead 23, together with a discriminating bit identifying the section of the classifier memory affected by the message; naturally, the code $(abcdef)$ containing the data of the subscriber station need not be limited to six decadic digits. The enabling signal is elicited by a request signal appearing on a lead 21.

A checking circuit CN, with inputs connected to transcoder PC and message generator PM, verifies the correctness of the words read out from both these circuits individually (as by the usual parity checks) and in light of each other. If no error is found to exist, circuit CN energizes a lead 43 extending to one input of an AND gate $N_1$ whose other input is tied to an output lead 45 of transcoder PC which carries a confirmation signal to teleprinter TL by way of a lead 47, an OR gate $N_2$ and feedback connection 25. Otherwise, an alarm generator SZ is triggered via a lead 44 from circuit CN to send a malfunction signal over a lead 46 to the teleprinter through OR gate $N_2$. An error developing within the classifier CD energizes a lead 24 also terminating at generator SZ so as to give rise to an alarm signal sent to the teleprinter. The information delivered to network TS by way of line 26 may be fed in manually, i.e. directly through the keyboard, or from a tape reader of printer TL.

Figure 6:
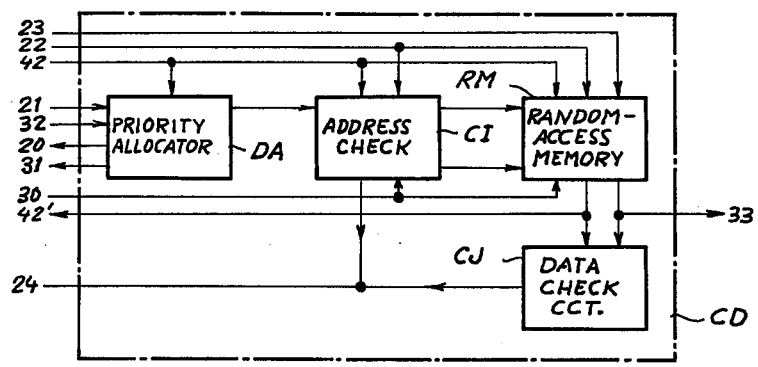

FIG. 6 shows the classifier CD as comprising a conventional priority allocator DA, triggerable by a request signal on lead 21, from which the lead 21 extends back to access circuit CQ of network TS (FIG. 5) to enable the transfer of a message on leads 22 and 23. Lead 22 extends to an address-checking circuit CI and, in parallel therewith, to a random-access memory RM which is enabled by a signal from circuit CI, if the address part of the message is correct, to receive the operative part of the message on lead 23 in the cell of its subscriber-line section or its line-link section identified by address (rst) or (xy). A reading circuit 42, 42' for the line-link section represents the leads 142, 242 and 142', 242' of FIG. 4; a similar reading circuit for the subscriber-line section comprises an address multiple 30 and an output lead 33. The two address multiples 42, 30 also have branches leading to checking circuit CI whereas the corresponding output leads 42', 33 have extensions terminating at another checking circuit CJ whose output, together with that of circuit CI, forms the alarm-signal input 24 of network TS.

Priority allocator DA can also be triggered, via a lead 32, by a request signal from data transmitter SG to which it responds by sending out an enabling signal over a lead 31.

Figure 7:
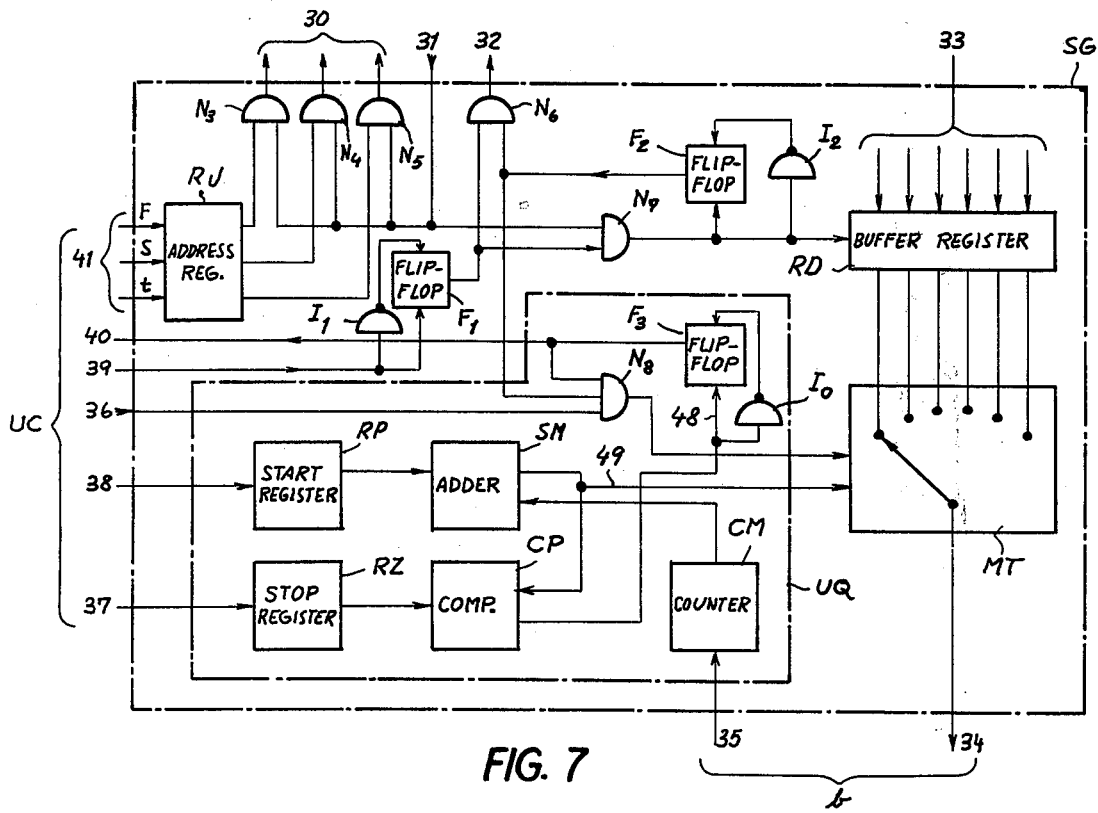

Details of data transmitter SG have been illustrated in FIG. 7. This component comprises an address register RJ to which a subscriber-line identification (rst), entered in one of the memory cells of programmer UC, is transmitted during a respective sampling phase via a multiple 41 after this component has been temporarily engaged by the programmer to extend a call originating at terminal TR (FIG. 1). Register RJ has three output multiples over which the binary words corresponding to the decadic digits r, s and t are delivered in parallel to line 30 through a set of AND gates $N_3$, $N_4$, $N_5$, each representing a plurality of such gates, after they have been unblocked by an enabling signal on lead 31. The request signal on lead 32 is generated by the setting of a flip-flop $F_1$ upon energization of a lead 39 by programmer UC, the set output of this flip-flop extending together with the reset output of another flip-flop $F_2$ to an AND gate $N_6$ working into lead 32. Another AND gate $N_7$ has inputs tied to the set output of flip-flop $F_1$ and to lead 31 so as to conduct upon the arrival of the enabling signal from classifier CD to set the flip-flop $F_2$ and terminate the request signal on lead 32, thereby releasing the classifier. Gate $N_7$ also energizes a writing input of a buffer register RD whose stages are connected in parallel to memory RM (FIG. 6) by way of multiple 33 whereby the subscriber data related to address (rst) are stored in that register.

A further AND gate $N_x$ has an input connected to the reset output of flip-flop $F_2$ and two other inputs tied to a signaling lead 36 of programmer UC and to the reset output of a third flip-flop $F_3$ which is settable by the energization of an output lead 48 of a comparator CP. All three flip-flops are reset, upon the de-energization of their setting inputs, through respective inverters $I_1$, $I_2$ and $I_3$. Thus, the disappearance of the enabling signal on lead 31 after the release of classifier CD unblocks the gate $N_x$ for the passage of a trigger signal on lead 36 conveyed to a multiplexer MT in the output of buffer register RD. A start register RP and a stop register RZ receive from the programmer, via respective connections 38 and 37, respective pulse counts marking the initial and the final position of the multiplexer, these counts determining what portions of the subscriber data stored in register RD are to be read out via an outgoing lead 34 (forming part of two-way connection b) to the engaged route register RG over the path described above. Connection b also comprises an incoming lead 35, terminating at a counter CM, which carries counting pulses generated by the route register in response to clock pulses generated at the exchange. Counter CM works into an adder SM which is also connected to start register RP so that its output 49 carries a code which at any time is the sum of the counts stored in circuits RP and CM; that code determines the position of the multiplexer. Comparator CP, connected to register RZ as well as to adder SM, energizes its own output lead 48 as soon as the code on output 49 matches the one stored in register RZ. The resulting switchover of flip-flop $F_3$ blocks the gate $N_8$ and reports to programmer UC, by the energization of an outgoing lead 40, that the contents of register RD (or a predetermined portion thereof) have been transferred in the necessary number of installments to the engaged route register whereupon the network SG is released by the de-energization of programmer lead 40, with resulting clearing of counters RP, RZ and CM via nonillustrated circuits.

Thus, the programmer UC can control the data transfer not only as to its scope but also in regard to the number of bits to be read out from register RD during each sampling phase allotted to a given line link, that number depending on the length of energization of lead 36 in any such phase. In a limiting case, only one bit will be transferred during each working cycle.

I claim:
1. In a telecommunication system including a terminal serving a multiplicity of subscriber lines and an automatic exchange at a nodal point joined to said terminal by a number of line links less than the number of said subscriber lines, said terminal being provided with a line concentrator/distributor controlled by a marker for temporarily assigning available line links to calling and called subscriber lines, said automatic exchange being provided with switch means for establishing connections between said line links and other parts of the system, said subscriber lines falling into different service classes restricting for at least certain of said subscriber lines the types of connections to be established,
    the combination therewith of a line-control unit at said nodal point communicating with said marker by way of signaling channel independent of said line links for exchanging engagement messages with said marker identifying a subscriber line involved in the establishment of a connection and a line link temporarily assigned thereto, said line-control unit comprising:
storage means connected to said signaling channel for registering engagement messages;
programming means periodically communicating with said storage means for detecting an engagement message registered therein;
classification means including a data store engageable by said programming means for reading out data, including service-class information, relating to a calling subscriber line identified in an engagement message, originating at said marker, said classification means being provided with a data-input circuit connected to a teleprinter; and retransmission means periodically connectable to said classification means under the control of said programming means for delivering the read-out data to said automatic exchange.

2. The combination defined in claim 1 wherein said line links are identified by a set of first addresses at said terminal and by a set of second addresses at said automatic exchange, said classification means including memory means storing said first and second sets of addresses for translating a first address in an arriving engagement message into a second address delivered to said automatic exchange.

3. The combination defined in claim 1 wherein said engagement messages contain only a local identification of calling subscriber lines, said classification means including memory means storing system-wide identifications of said subscriber lines for translating a local identification in an engagement message from said marker into a system-wide identification delivered to said automatic exchange.

4. The combination defined in claim 1 wherein said data-input circuit includes checking circuitry for verifying the accuracy of data to be stored therein, said checking circuitry having a feedback connection to said teleprinter.

5. The combination defined in claim 4 wherein said checking circuitry has a branch extending to said classification means for verifying the accuracy of data to be read out from said data store.

6. The combination defined in claim 1 wherein said programming means includes scanning means for establishing aa recurrent working cycle divided into a multiplicity of sampling phases and at least one service phase, said programming means communicating with said storage means in said service phase, said automatic exchange being provided with a set of route registers and with coupling means for making said route registers available to line links identified in said engagement messages, said retransmission means being coupled by way of respective connectors within said automatic exchange to said line links for loading the read-out data into registers engaged thereby, said line-control unit further comprising access circuitry controlled by said scanning means for activating said connectors during respective sampling phases to facilitate loading of the engaged route registers.

7. In a telecommunication system including a terminal serving a multiplicity of subscriber lines and an automatic exchange at a nodal point joined to said terminal by a number of line links less than the number of said subscriber lines, said line links being identified by a set of first addresses at said terminal and by a set of second addresses at said automatic exchange, said terminal being provided with a line concentrator/distributor controlled by a marker for temporarily assigning available line links to calling and called subscriber lines, said automatic exchange being provided with switch means for establishing connections between said line links and other parts of the system, said subscriber lines falling into different service classes restricting for at least certain of said subscriber lines the types of connections to be established,
the combination therewith of a line-control unit at said nodal point communicating with said marker by way of signaling channel independent of said line links for exchanging engagement messages with said marker identifying a subscriber line involved in the establishment of a connection and a line link temporarily assigned thereto, said line-control unit comprising:
storage means connected to said signaling channel for registering engagement messages;
programming means periodically communicating with said storage means for detecting an engagement message registered therein;
classification means including a data store engageable by said programming means for reading out data, including service-class information, relating to a calling subscriber line identified in an engagement message, originating at said marker, said classification means including memory means storing said first and second sets of addresses for translating a first address in an arriving engagement message into a second address delivered to said automatic exchange; and
retransmission means periodically connectable to said classification means under the control of said programming means for delivering the read-out data to said automatic exchange.

8. In a telecommunication system including a terminal serving a multiplicity of subscriber lines and an automatic exchange at a nodal point joined to said terminal by a number of line links less than the number of said subscriber lines, said terminal being provided with a line concentrator/distributor controlled by a marker for temporarily assigning available line links to calling and called subscriber lines, said automatic exchange being provided with switch means for establishing connections between said line links and other parts of the system, said subscriber lines falling into different service classes restricting for at least certain of said subscriber lines the types of connections to be established,
the combination therewith of a line-control unit at said nodal point communicating with said marker by way of signaling channel independent of said line links for exchanging engagement messages with said marker identifying a subscriber line involved in the establishment of a connection and a line link temporarily assigned thereto, said engagement messages containing only a local identification of calling subscriber lines, said line-control unit comprising:
storage means connected to said signaling channel for registering engagement messages;
programming means periodically communicating with said storage means for detecting an engagement message registered therein;
classification means including a data store engageable by said programming means for reading out data, including service-class information, relating to a calling subscriber line identified in an engagement message, originating at said marker, said classification means including memory means storing system-wide identifications of said subscriber lines for translating a local identification in an engagement message from said marker into a system-wide identification delivered to said automatic exchange; and
retransmission means periodically connectable to said classification means under the control of said programming means for delivering the read-out data to said automatic exchange.

9. In a telecommunication system including a terminal serving a multiplicity of subscriber lines and an automatic exchange at a nodal point joined to said terminal by a number of line links less than the number of said subscriber lines, said terminal being provided with a line concentrator/distributor controlled by a marker for temporarily assigning available line links to calling and called subscriber lines, said automatic exchange being provided with a switch means for establishing connections between said line links and other parts of the system, said subscriber lines falling into different service classes restricting for at least certain of said subscriber lines the types of connections to be established, the combination therewith of a line-control unit at said nodal point communicating with said marker by way of signaling channel independent of said line links for exchanging engagement messages with said marker identifying a subscriber line involved in the establishment of a connection and a line link temporarily assigned thereto, said line-control unit comprising:

storage means connected to said signaling channel for registering engagement messages;

programming means periodically communicating with said storage means for detecting an engagement message registered therein;

classification means including a data store engageable by said programming means for reading out data, including service-class information, relating to a calling subscriber line identified in an engagement message, originating at said marker; and retransmission means periodically connectable to said classification means under the control of said programming means for delivering the read-out data to said automatic exchange;

said programming means including scanning means for establishing a recurrent working cycle divided into a multiplicity of sampling phases and at least one service phase, said programming means communicating with said storage means in said service phase, said automatic exchange being provided with a set of route registers and with coupling means for making said route registers available to line links identified in said engagement messages, said retransmission means being coupled by way of respective connectors within said automatic exchange to said line links for loading the read-out data into registers engaged thereby, said line-control unit further comprising access circuitry controlled by said scanning means for activating said connectors during respective sampling phases to facilitate loading of the engaged route registers.

10. The combination defined in claim 9 wherein said line-control unit further comprises address-receiving means coupled to said connectors for delivering to said programming means during respective sampling phases, for retransmission to said marker by way of said signalling channel, identifications of line links and called subscriber lines contained in engagement messages received by said automatic exchange.

11. The combination defined in claim 9 wherein said retransmission means comprises buffer means for temporary storage of data read out from said classification means and multiplexing means controlled by said programming means inserted between said buffer means and said automatic exchange for delivering selected portions of data stored in said buffer means, destined for an engaged register, to the corresponding connector during successive working cycles.

12. The combination defined in claim 9 wherein said line-control unit includes continuity-testing means controlled by said programming means for transmitting an audio signal, during a respective sampling phase, via the corresponding connector to said marker over a line link identified in an engagement message and detecting a response signal from said marker arriving over said signaling channel.

* * * * *